(12) United States Patent
Knowlton (10) Patent No.: US 9,578,992 B2
(45) Date of Patent: Feb. 28, 2017

(54) ROTATABLE COFFEE POD STORAGE DEVICE

(71) Applicant: Bryan Knowlton, San Angelo, TX (US)

(72) Inventor: Bryan Knowlton, San Angelo, TX (US)

( * ) Notice: Subject to any disclaimer, the term of this patent is extended or adjusted under 35 U.S.C. 154(b) by 0 days.

(21) Appl. No.: 14/618,088

(22) Filed: Feb. 10, 2015

(65) Prior Publication Data
US 2016/0227968 A1 Aug. 11, 2016

(51) Int. Cl.
| | | |
|---|---|---|
| A47F 7/00 | (2006.01) |
| A47J 47/16 | (2006.01) |
| F16M 11/10 | (2006.01) |
| F16M 11/20 | (2006.01) |
| F16M 11/22 | (2006.01) |
| F16B 1/00 | (2006.01) |
| F16M 13/02 | (2006.01) |
| A47J 31/44 | (2006.01) |

(52) U.S. Cl.
CPC .............. *A47J 47/16* (2013.01); *A47J 31/44* (2013.01); *F16B 1/00* (2013.01); *F16M 11/10* (2013.01); *F16M 11/2028* (2013.01); *F16M 11/22* (2013.01); *F16M 13/02* (2013.01); *F16B 2001/0035* (2013.01)

(58) Field of Classification Search
CPC .. A47F 5/02; A47F 5/0037; A47F 5/03; A47J 31/3642
See application file for complete search history.

(56) References Cited

U.S. PATENT DOCUMENTS

| | | | | |
|---|---|---|---|---|
| 905,975 | A | * | 12/1908 | Anderson ................ 211/76 |
| 1,448,259 | A | * | 3/1923 | Cook ..................... 294/143 |
| 1,500,544 | A | * | 7/1924 | Brockley ................ 99/440 |
| 1,728,512 | A | * | 9/1929 | Sharp .................... 211/77 |
| 1,927,283 | A | * | 9/1933 | Hernandez ............. 211/78 |
| 2,191,693 | A | * | 2/1940 | Havlis .................... 211/74 |
| D165,303 | S | * | 11/1951 | Rogers et al. ......... D7/706 |
| 2,883,063 | A | * | 4/1959 | Baren .................... 211/78 |
| 3,805,965 | A | * | 4/1974 | Champagne ........... 211/77 |
| 4,334,623 | A | * | 6/1982 | Geary .................... 211/85.29 |
| 4,534,471 | A | * | 8/1985 | Zahn et al. ............ 211/39 |
| D311,565 | S | * | 10/1990 | Buri et al. ............. D6/552 |
| 5,673,802 | A | * | 10/1997 | Valentino .............. 211/70 |
| D392,163 | S | * | 3/1998 | Jenkinson ............. D7/704 |
| 5,772,050 | A | * | 6/1998 | Shih ...................... 211/39 |
| 6,305,319 | B1 | * | 10/2001 | Olsson .................. 119/51.01 |
| 6,394,030 | B1 | * | 5/2002 | Geiger et al. ......... 119/57.8 |
| 6,500,666 | B1 | * | 12/2002 | Clements-Macak et al. ................ 435/303.3 |
| D471,326 | S | * | 3/2003 | Weiser et al. ......... D30/124 |
| D508,349 | S | * | 8/2005 | Wu ........................ D6/680.1 |
| D509,031 | S | * | 8/2005 | Weiser et al. ......... D30/124 |
| D511,867 | S | * | 11/2005 | Weiser et al. ......... D30/124 |
| 6,971,613 | B2 | * | 12/2005 | Shendelman .......... 248/150 |
| D587,076 | S | * | 2/2009 | Grady .................... D7/704 |
| D617,124 | S | * | 6/2010 | Snider .................... D6/708 |

(Continued)

*Primary Examiner* — Joshua Rodden
*Assistant Examiner* — Kimberly S Wright
(74) *Attorney, Agent, or Firm* — Pierson IP, PLLC (57) ABSTRACT

A coffee pod storage device to hold a pod of beverage may include a base to support the pod holder, a spacer to connect to the base, a disk to rotate with respect to the spacer, and a pad chair connected to the disk to pivot as the disk is rotated and to hold a beverage pod.

10 Claims, 11 Drawing Sheets

(56) References Cited

U.S. PATENT DOCUMENTS

| | | | |
|---|---|---|---|
| D623,875 S * | 9/2010 | Snider | D7/600.2 |
| D634,137 S * | 3/2011 | Chapman et al. | D6/680.3 |
| D634,978 S * | 3/2011 | Tiemann | D7/600.4 |
| D651,454 S * | 1/2012 | Chin | D7/401.2 |
| 8,104,629 B1 * | 1/2012 | Plumer | 211/74 |
| D661,162 S * | 6/2012 | Hertaus | D7/600.4 |
| D662,782 S * | 7/2012 | Tiemann | D7/600.2 |
| D664,401 S * | 7/2012 | Tiemann | D7/600.4 |
| 8,292,096 B2 * | 10/2012 | Thompson | 211/77 |
| 8,302,787 B2 * | 11/2012 | Tobey et al. | 211/77 |
| 8,342,341 B2 * | 1/2013 | Cass et al. | 211/70 |
| D676,685 S * | 2/2013 | Dobelbower | D6/680.1 |
| D680,382 S * | 4/2013 | Tiemann | D7/600.2 |
| D680,383 S * | 4/2013 | Tsai | D7/600.4 |
| D680,384 S * | 4/2013 | Tsai | D7/600.4 |
| 8,418,859 B2 * | 4/2013 | Chen | 211/59.2 |
| D686,465 S * | 7/2013 | Goodman et al. | D7/600.4 |
| D688,529 S * | 8/2013 | Tiemann | D7/600.2 |
| D688,919 S * | 9/2013 | Tiemann | D7/600.4 |
| 8,590,715 B2 * | 11/2013 | Gray | 211/85.18 |
| D698,607 S * | 2/2014 | Chen | D7/600.4 |
| D703,006 S * | 4/2014 | Hsu | D7/600.4 |
| 8,887,930 B1 * | 11/2014 | Krull et al. | 211/77 |
| 9,107,527 B2 * | 8/2015 | Krull et al. | |
| D743,749 S * | 11/2015 | Lee et al. | D7/600.2 |
| 2002/0170868 A1 * | 11/2002 | Morgan | 211/77 |
| 2005/0194336 A1 * | 9/2005 | Wu | 211/164 |
| 2005/0263084 A1 * | 12/2005 | Weiser et al. | 119/57.8 |
| 2010/0089848 A1 * | 4/2010 | Thompson | 211/77 |
| 2012/0085716 A1 * | 4/2012 | Chen | 211/41.11 |
| 2014/0014603 A1 * | 1/2014 | Thompson | 211/78 |

\* cited by examiner

ROTATABLE COFFEE POD STORAGE DEVICE

BACKGROUND INFORMATION

1. Field of the Invention

Examples of the present disclosure are related to systems and methods for a coffee pod storage device. More particularly, embodiments relate to a rotatable coffee pod storage device that is configured to hold coffee pod in different orientations.

2. Background

Single serving coffee makers, such as Keurig, have become prevalent in the marketplace. These single serving coffee makers have a variety of configurations, such as single-serve coffee pods, packets, etc. A single-serve coffee pod typically includes pre-ground coffee secured within a relatively small disposable container.

When using coffee pods, users are required to purchase an ample amount of the coffee pods. However, storing the coffee pods may require an excessive amount of space. The quantity of stored and readily accessible coffee pods makes effectively and efficiently storing coffee pods arduous.

Conventionally, coffee pods are stored in racks with a plurality of rows and columns. However, these racks require valuable shelf or cabinet space.

Accordingly, needs exist for more effective and efficient systems and methods storing coffee pods.

SUMMARY

Embodiments disclosed herein describe systems and methods for a rotatable coffee pod storage device. The coffee pod storage device may be configured store a plurality of coffee pods in different configurations, and the coffee pod storage device may be configured to be mounted on different surfaces in different orientations. In embodiments, based on the mounting of the coffee pod storage device on a surface, the plurality of coffee pods may be secured to coffee pod storage device in different directions. Accordingly, the coffee pod storage device may effectively and efficiently store coffee pods, while reducing the amount of space required to store the pods.

Embodiments of the coffee pod storage device may include a base, shaft, support frame, disk, and a plurality of chairs.

In embodiments, the base may be a magnetic base that is configured to couple with a surface of a building, appliance (e.g. refrigerator, microwave, etc.), wall, counter, etc. (referred to hereinafter collectively and individually as "a surface"). One skilled in the art will appreciate that the base may be configured to couple with a surface via other coupling mechanisms such as Velcro, screws, nails, bolts, buttons, clasps, fasteners, adhesives, etc.

In embodiments, a first end of a shaft may be coupled to the base and a second end of the shaft may be coupled with the support frame. The shaft may extend perpendicular away from the base, wherein the length of the shaft may be at least the length of a coffee pod. Therefore, coffee pods may be positioned between the base and the support frame.

In embodiments, the support frame may be configured to be coupled with the shaft and a disk. The support frame may be configured to rotate around an axis defined by the shaft via the disk. The support frame may rotate in a first direction or a second direction, wherein the first direction and the second directions are opposite directions around the shaft.

In embodiments, the support frame may have a plurality of arms that are configured to extend away from the support frame in a direction that is perpendicular to the shaft. At the end of each of the plurality of arms may be projections, wherein the projections extend in a direction that is perpendicular to the arms and towards the base.

In embodiments, a chair may be configured to be coupled with a projection. The chair may be configured to secure and hold a coffee pod, while also allowing the coffee pod to be removed from the chair. In embodiments, the chair may have a first set of coffee pod holders and a second set of coffee pod holders. The first set of coffee pod holders may be positioned to hold a coffee pod in a first direction, and the second set of coffee pod holders may be configured to hold the coffee pod in a second direction. Therefore, the chair may hold coffee pods in different directions based on the placement of the base on a surface.

Accordingly, in embodiments a magnetic base may secure the coffee pod storage device to the side of an appliance. The shaft located in the middle of the base allows the support frame to be rotated either clockwise or counter clockwise. Furthermore, chairs coupled to the support frame are configured to hold coffee pods at an acute angle that prevents the coffee pods from falling out of a respective chair. The chairs are free to pivot on an axle due to gravity, which may prevent the pods from being removed from the chair when the support frame is rotated.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In The following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a rotatable coffee pod storage device. The coffee pod storage device may be configured store a plurality of coffee pods in different configurations, and the coffee pod storage device may be configured to be mounted on different surfaces in different orientations. In further embodiments, the coffee pod storage device may be configured to house and/or store other objects.

Figure 1:
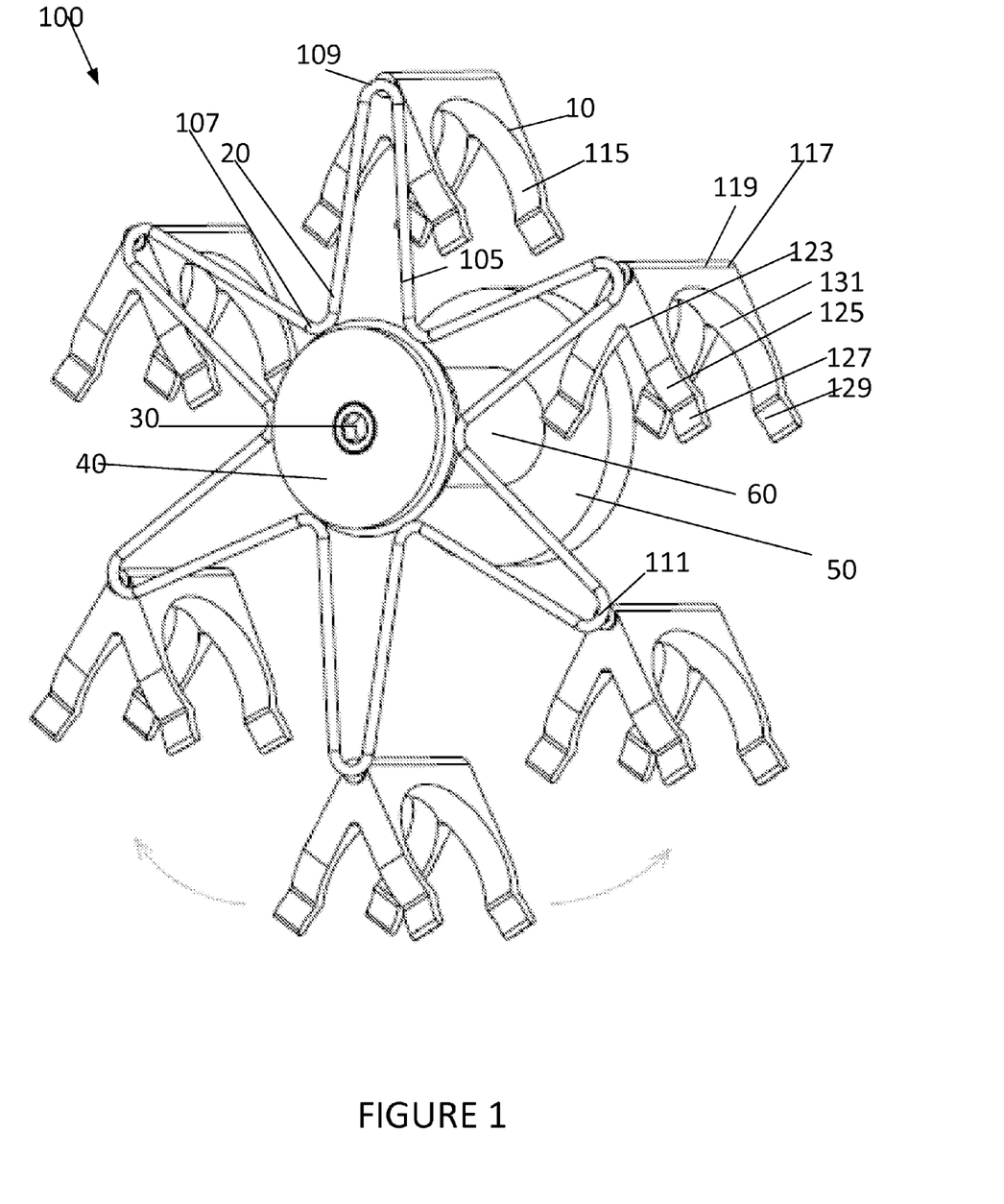
FIG. 1 illustrates a perspective view of the coffee pod storage device of the present invention.

Turning now to FIG. 1, FIG. 1 depicts one embodiment of a coffee pod storage device 100. Coffee pod storage device 100 may include base 50, shaft 60, spacer 40, center shaft 30, support frame 20, and chairs 10.

Base 50 may be a structural support to coffee pod storage device that is configured to be coupled with a surface. In embodiments, base 50 may be magnetic and may be connected to a shaft 60. Shaft 60 may be an elongated cylinder having a diameter which may be less than the base 50. The shaft 60 may be connected to a disk/spacer 40. Spacer 40 may rotate about a center shaft 30. Center shaft 30 may be a bolt or other type of fastener/shaft, and the spacer 40 may be connected to a support frame 20. Support frame 20 may be a frame that may be pivotably connected to the chair 10

The support frame 20 may include at least one of a multitude of angled radial arms 105 which may be connected by at least one of a multitude of a pair of opposing U-shaped connecting arms 107 to connect adjacent radial arms 105. The angled radial arms 105 and the U-shaped connecting arms 107 may be substantially connected in a horizontal plane. One of the opposed U-shaped connecting arms 107 may be connected to the shaft 60 while the other of the opposed U-shaped connecting arms 7 may be connected to an axial arm 109 with respect to the shaft 60.

The axial arm 109 may extend through a sleeve 111. Sleeve 11 may be a narrow cavity positioned through chair 10.

The axial arm 109 may pivot within the sleeve 111. The chair 10 may pivot as the coffee pod storage device 100 is rotated as a result of the changing gravitational force on the chair 10.

The chair 10 may include four opposing holding arms 115 to grip and hold by providing a frictional fit with the pod which may include the concentrated beverage. Other number of arms may be used to retain the pod. Each holding arm 115 may include a top surface 117, an opposing bottom surface 119, and a connecting side surface 121 to connect the top surface 117 with the bottom surface 119.

The top surface 117 may include a first horizontal portion 123 which may be connected to an inclined portion 125 which may be connected to a second horizontal portion 127 and which may be inclined at an acute angle. The side surface 121 may be substantially vertical. The bottom surface 119 may have a horizontal portion 129 and a curved portion 131.

Chair 10 may be an apparatus that is configured to hold and store a coffee pod, while allowing the coffee pod to be removed from chair 10. In embodiments, chair 10 may house the coffee pod in a first direction or a second direction. The direction that the coffee pod is housed within chair 10 may be based on the orientation of base 50, shaft 40, and the position of a user. If the user is standing in front of coffee pod storage device and shaft 40 extends away from base 50 in a first direction from the perspective of the user, chair 10 may house the coffee pod in the first direction. If the user is standing in front of coffee pod storage device and shaft 40 extends away from base 50 in a second direction from the perspective of the user, chair 10 may house the coffee pod in the second direction.

Figure 2:
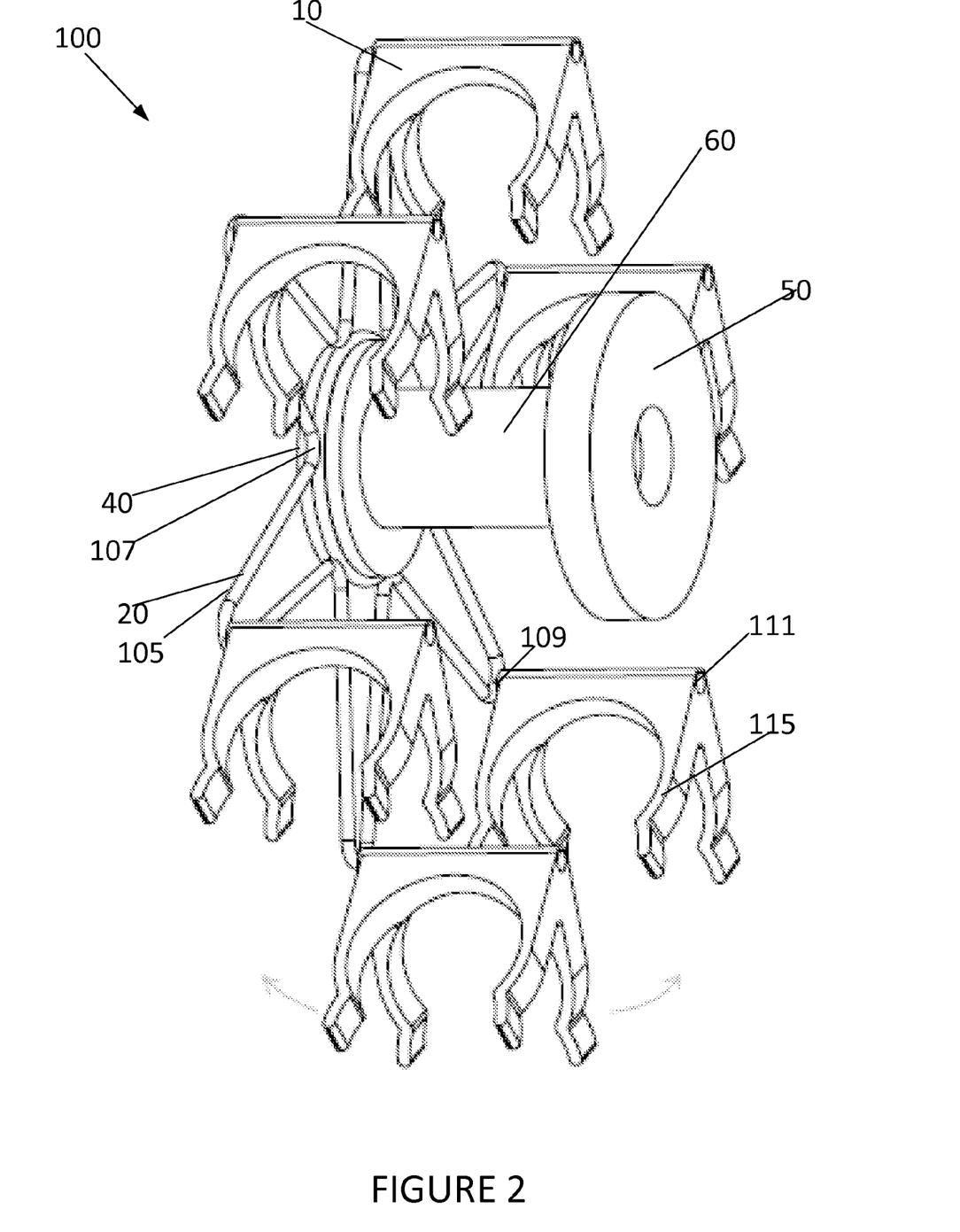
FIG. 2 illustrates a bottom perspective view of the coffee pod storage device of the present invention.

FIG. 2 illustrates a perspective view of a coffee pod storage device 100, which may include a magnetic base 50. Magnetic base 50 may be connected to a shaft 60. Shaft 60 may be an elongated cylinder having a diameter which may be less than the base 50. The shaft 60 may be connected to a disk/spacer 40. Spacer 40 may rotate about a center shaft 30, which may be a bolt or other type of fastener/shaft. Additionally, spacer 40 may be connected to a support frame 20 which may be formed from wire and which may be pivotably connected to the chair 10 which may be a K-cup chair.

The support frame 20 may include at least one of a multitude of angled radial arms 105 which may be connected by at least one of a multitude of a pair of opposing U-shaped connecting arms 107 to connect adjacent radial arms 105. The angled radial arms 105 and the U-shaped connecting arms 107 may be substantially connected in a horizontal plane. One of the opposed U-shaped connecting arms 107 may be connected to the shaft 60 while the other of the opposed U-shaped connecting arms 107 may be connected to an axial arm 109 with respect to the shaft 60.

The axial arm 109 may extend through a sleeve 111 which may be connected to the back surface 113 of the chair 10.

The axial arm 109 may pivot within the sleeve 111. The chair 10 may pivot as the coffee pod storage device 100 is rotated as a result of the changing gravitational force on the chair 10.

The chair 10 may include four opposing holding arms 115 to grip and hold by providing a frictional fit with the pod which may include the concentrated beverage.

Figure 3:
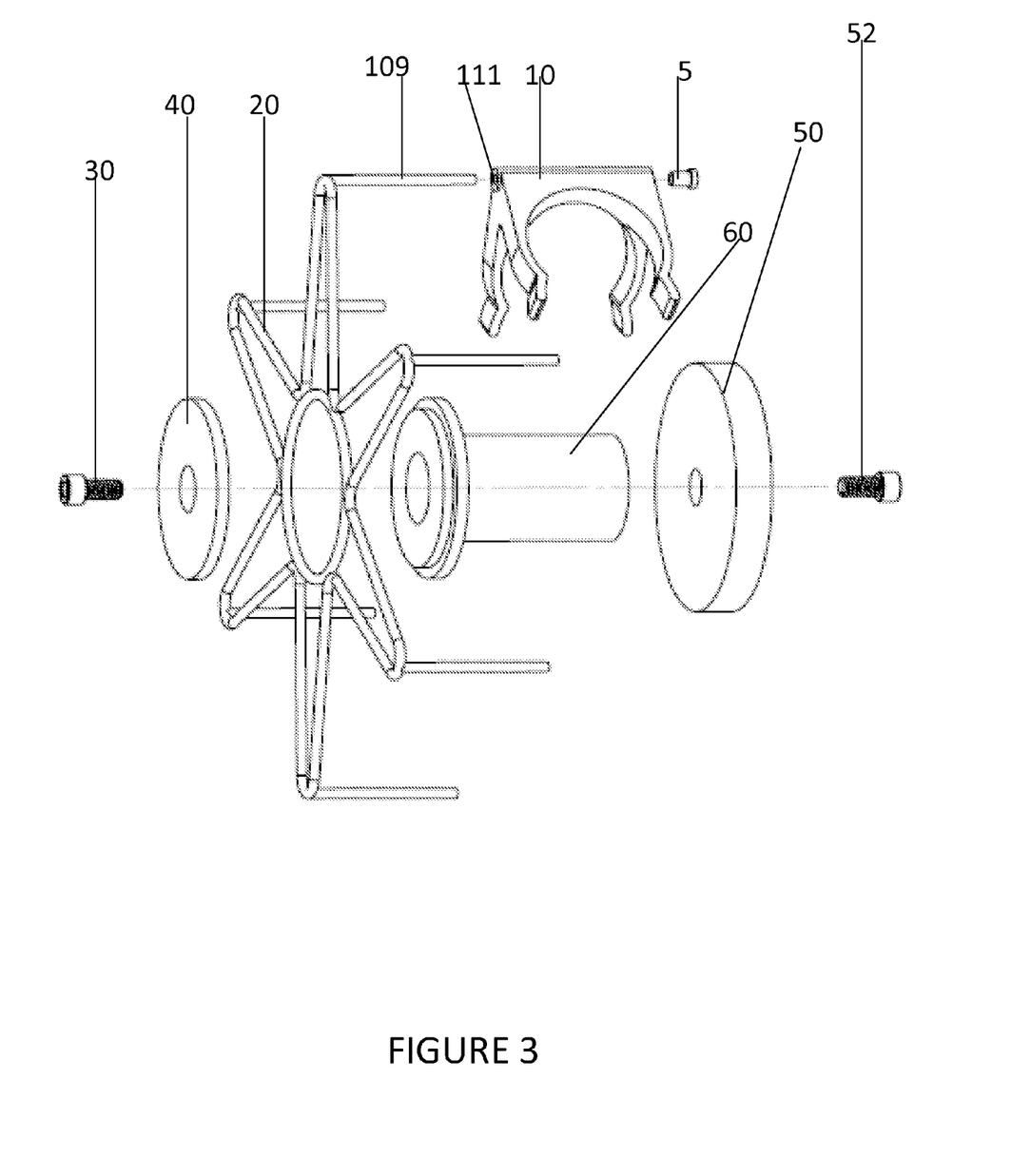
FIG. 3 illustrates an exploded view of the coffee pod storage device of the present invention.

FIG. 3 illustrates an exploded view of a coffee pod storage device 100. As depicted in FIG. 3, magnetic base 50 which may be connected to a shaft 60 via bolt 52. Shaft 60 may be an elongated cylinder having a diameter less than the diameter of base 50. The shaft 60 may be connected to a disk/spacer 40.

Spacer 40 may be configured to couple with shaft 60 via a projection on a lower surface of spacer 40 and a groove an outer surface of shaft 60. Responsive to inserting spacer 40 into shaft 60, spacer 60 may be configured to rotate in a clockwise and counter clockwise, while shaft 60 may remain in a fixed position. Furthermore, spacer 40 may be coupled to shaft 60 via center shaft 30. Center shaft 30 may be a bolt or other type of fastener/shaft.

In embodiments, support frame 20 have a circumference that is configured to align and fit over the circumference of spacer 40. Accordingly, when support frame 20 is coupled over the circumference of spacer 40 and spacer 40 rotates, support frame 20 may also rotate.

Support frame 20 may be formed of wire. Support frame 20 may be configured to be coupled with a plurality of chairs via axial arms 109 and sleeve 111, wherein the chairs may rotate individually. At a second end of sleeve 111 may be a cap 5 that is configured to cover the second end of sleeve 111.

Figure 4:
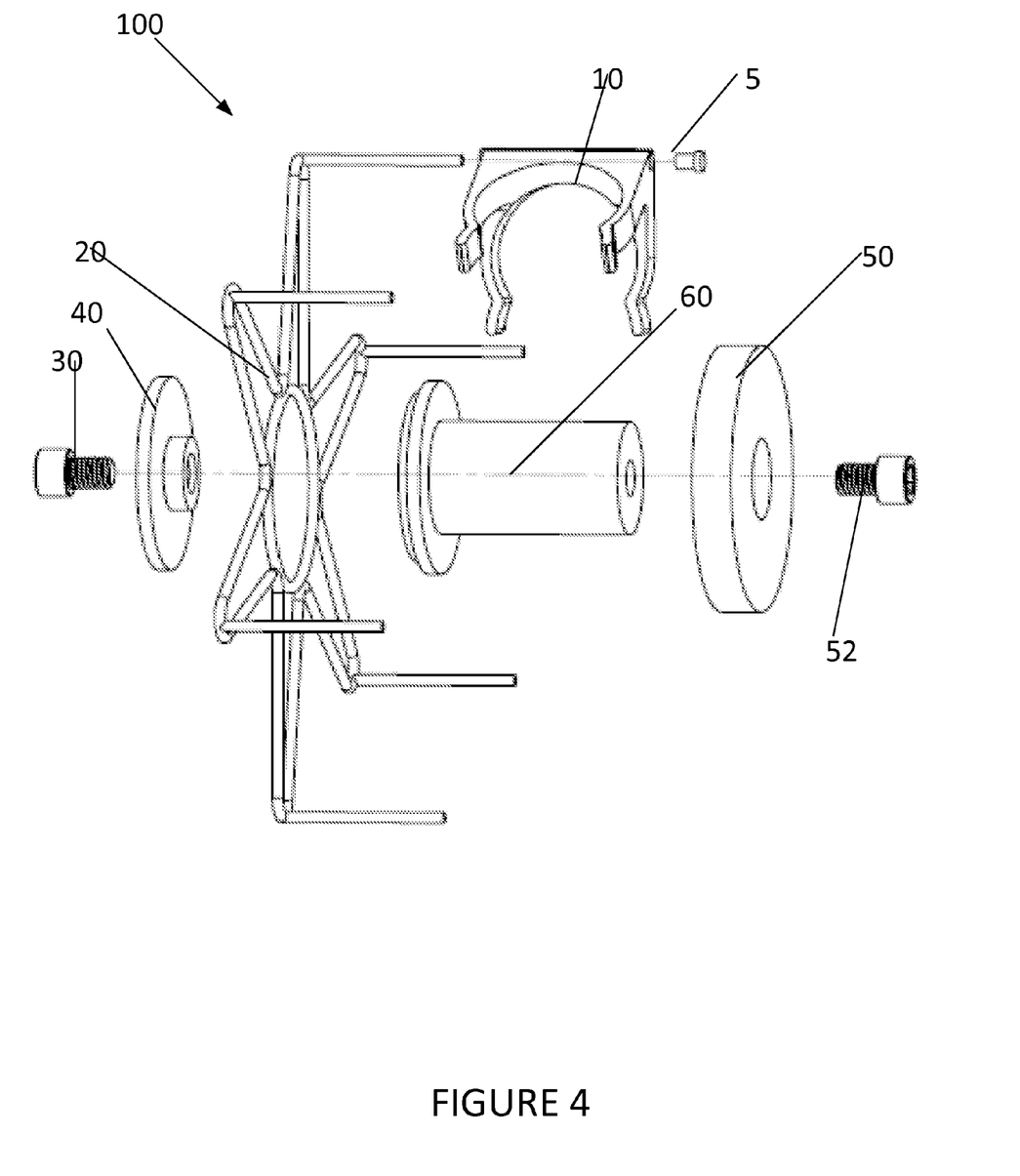
FIG. 4 illustrates an exploded view of the coffee pod storage device of the present invention.
Figure 5:
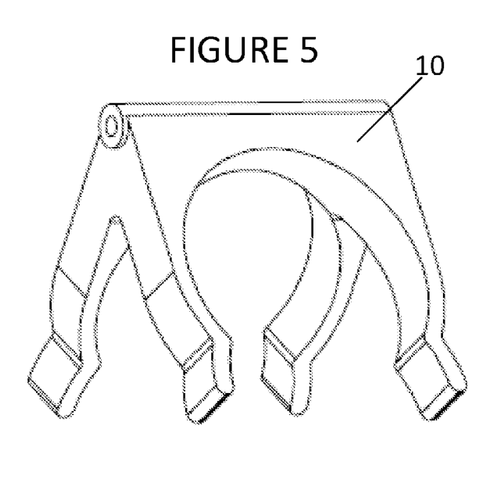
FIG. 5 illustrates a perspective view of a chair of the present invention.
Figure 6:
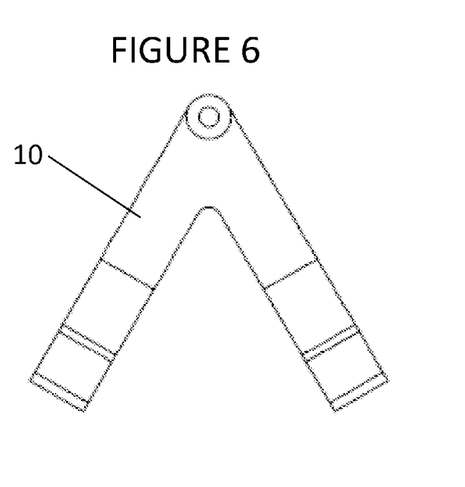
FIG. 6 illustrates a top view of the chair of the present invention.
Figure 7:
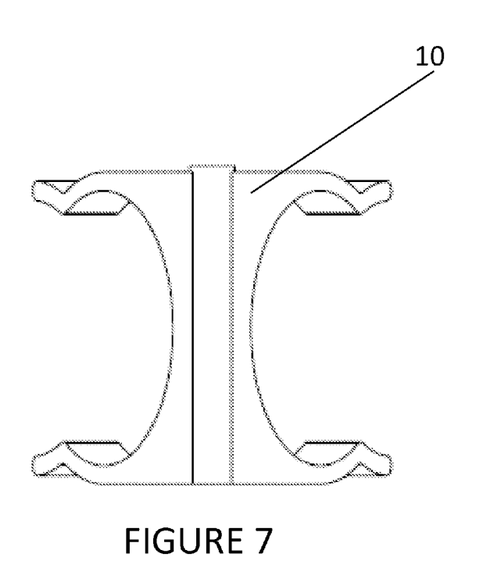
FIG. 7 illustrates a back view of the chair of the present invention.
Figure 8:
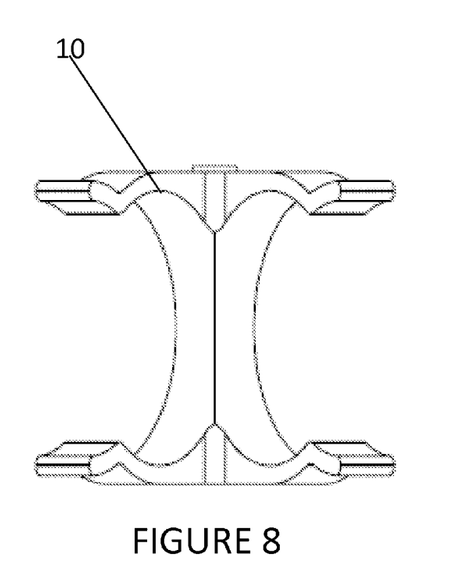
FIG. 8 illustrates a front view of the chair of the present invention.

FIG. 4 illustrates an exploded view of a coffee pod storage device 100 of the present invention which may include a magnetic base 50 which may be connected to a shaft 60 which may be an elongated cylinder having a diameter which may be less than the base 50. The shaft 60 may be connected to a spacer 40. Spacer 40 may rotate about a center shaft 30, wherein center shaft 30 may be a bolt or other type of fastener/shaft. Additionally, spacer 40 may be connected to a support frame 20.

The top surface 117 may include a first horizontal portion 123 which may be connected to an inclined portion 125. Inclined portion 125 may be connected to a second horizontal portion 127. Additionally, inclined portion 125 may be inclined at an acute angle. The side surface 121 may be substantially vertical. The bottom surface 119 may have a horizontal portion 129 and a curved portion 131. The back surface 113 of the chair 10 may be curved to mate with the sleeve 111.

FIG. 5-8 illustrates perspective views that the chair 10.

Figure 9:
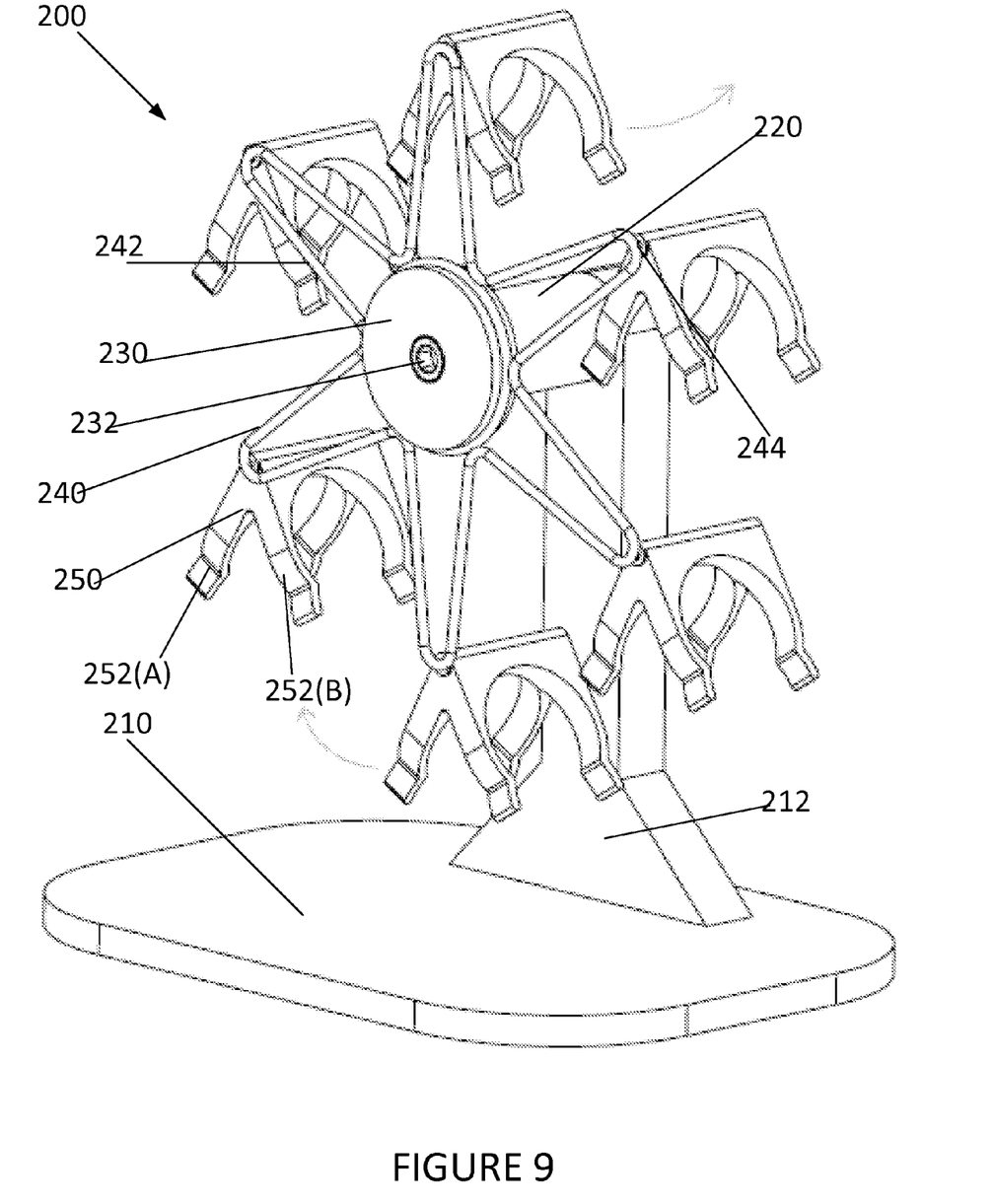
FIG. 9 illustrates the perspective view of the coffee pod storage device of the present invention.

FIG. 9 illustrates a perspective view of the coffee pod storage device 200. Coffee pod storage device 200 may be configured to be mounted on a counter surface, on an appliance, on a side of an appliance, a wall of a building, etc. Coffee pod storage device 200 may include a base 210, support leg 212, a shaft 220, disk 230, support frame 240, and a plurality of chairs 250.

Base 210 may be a base that is configured to couple with a surface. In embodiments, base 210 may be configured to be placed on a surface such as a countertop. In other embodiments, base 210 may be configured to couple to a surface, such as a sidewall of an appliance, via a coupling mechanism. The coupling mechanism may be magnets, Velcro, screws, nails. Bolts, buttons, clasps, fasteners, adhesives, etc. Base 210 may have a substantially planar surface that is configured to support coffee pod storage device 200. Base 210 may be coupled to a support leg 212. Support leg 212 may be configured to project away from base 210 in a direction that is perpendicular to base 200. Support leg 212 may extend away from base 21 to provide ample distance for coffee pods to be rotated above base 210 without contacting base 210.

Shaft 220 may configured extend away from support leg 212 in a direction that is perpendicular to support leg 212 and parallel to the plane of base 210. Shaft 220 may extend away from support leg 212 to provide ample distance for coffee pods to be rotated in-front of support leg 212 without contacting support leg 212. A first end of shaft 220 may be coupled to support leg 212, and a second end of shaft 220 may be coupled with disk 230.

Disk 230 may be configured to freely rotate in a first direction and a second direction, while disk 230 is coupled to stationary shaft 220. Disk 230 may have a circumference that is substantially the same size as the second end of shaft 220, wherein a face of disk 230 is configured to be positioned adjacent to a face of second end of shaft 220. Disk 230 may be coupled to shaft 220 via center shaft 232. Center shaft 232 may be a bolt or other type of fastener, which is configured to couple disk 230 to shaft 220, while allowing for disk 230 to rotate.

Support frame 240 may be a device that is configured to hold a plurality of chairs that hold coffee pods, while support frame 240 is rotated around an axis. Support frame 240 may have an inner circumference that is configured to encompass a circumference of disk 230. More so, the inner circumference of support frame 240 is configured to be positioned adjacent to the circumference of disk to couple support frame 240 and disk 230. In embodiments, support frame 240 may be configured to rotate in a first direction and a second direction, wherein the first direction may be a clockwise direction and the second direction may be a counter clockwise direction.

Support frame 240 may have a plurality of arms 242, wherein the plurality of arms extend away from the inner circumference of support frame 240. The plurality of arms 242 may extend away from the inner circumference in a plane that is perpendicular to the axis of rotation of support frame 240. In embodiments, a first end of each of the plurality of arms may be proximate to the inner circumference, and a second end of each of the arms may have a projection 244 that is configured to couple with a respective chair 250. The projection 244 may be configured to extend perpendicularly away from arm 242, and be configured to be inserted into an orifice through the body of chair 250. Accordingly, responsive to inserting the projection 244 through the orifice through chair 250, chair 250 may be coupled to support frame 240.

Each of the plurality of chairs 250 may be configured to hold a coffee pod, wherein the coffee pod may be positioned in a first orientation of a second orientation. Each of the plurality of chairs 250 may be configured to freely and independently rotate. Once a coffee pod is positioned within a chair 250, the weight of the coffee pod may cause the chair to rotate, such that an upper surface of the coffee pod is presented to a user. The coffee pods may be positioned within the chairs 250 based on placement of base 210 on a surface, wherein the coffee pods may be positioned to be more easily accessible.

Each of the plurality of chairs 250 may have two sets of coffee pod holders 252. A first set of coffee pod holders 252(A) may be configured to hold a coffee pod in a second direction, and a second set of coffee pod holders 252(B) may hold a coffee pod in a second direction. In embodiments, if a coffee pod is secured within first coffee pod holder 252(A), a coffee pod may not be positioned within second coffee pod holder 252(B), and vice versa.

First set of coffee pod holders 252(A) and second set of coffee pod holders 252(B) may be symmetrical. Each set may include two arms that are configured to encompass and fit around a coffee pod, wherein an upper surface of the coffee pod may be positioned over and adjacent to an upper surface of each of the arms in the coffee pod holders 252.

In embodiments, each coffee pod holder 252 may have a set of declined arms, which are configured to extend downward from projection 244. The declined arms may be positioned at a downward angle due to the weight of a coffee pod positioned within coffee pod holder 252.

The declined arms may be shaped to have a circumference that is substantially similar to that of a coffee pod, such that the coffee pod may be secured in place at a declined angle via pressure applied by the declined arms to the coffee pod. Responsive to a user applying pressure on the coffee pod to remove the coffee pod from a chair 250, the coffee pod may apply pressure to the declined arms to open the declined arms, such that the coffee pod may be removed from chair 250.

Figure 10:
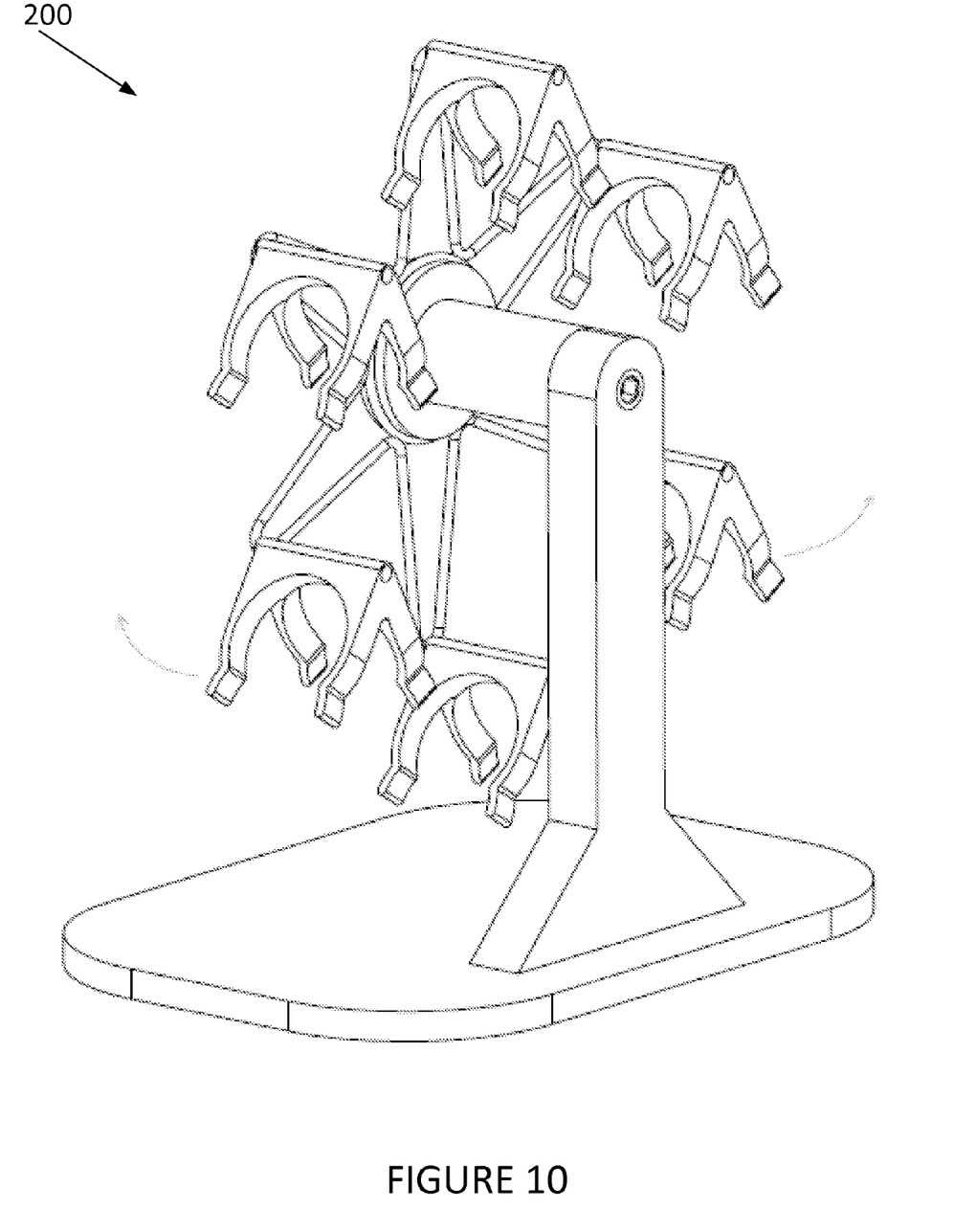
FIG. 10 illustrates a perspective view of the coffee pod storage device of the present invention.

FIG. 10 depicts a perspective view of coffee pod storage device 200. Elements depicted in FIG. 10 may be substantially the same as those described in FIG. 9. Therefore, for the sake of brevity a further description of those elements is omitted.

Figure 11:
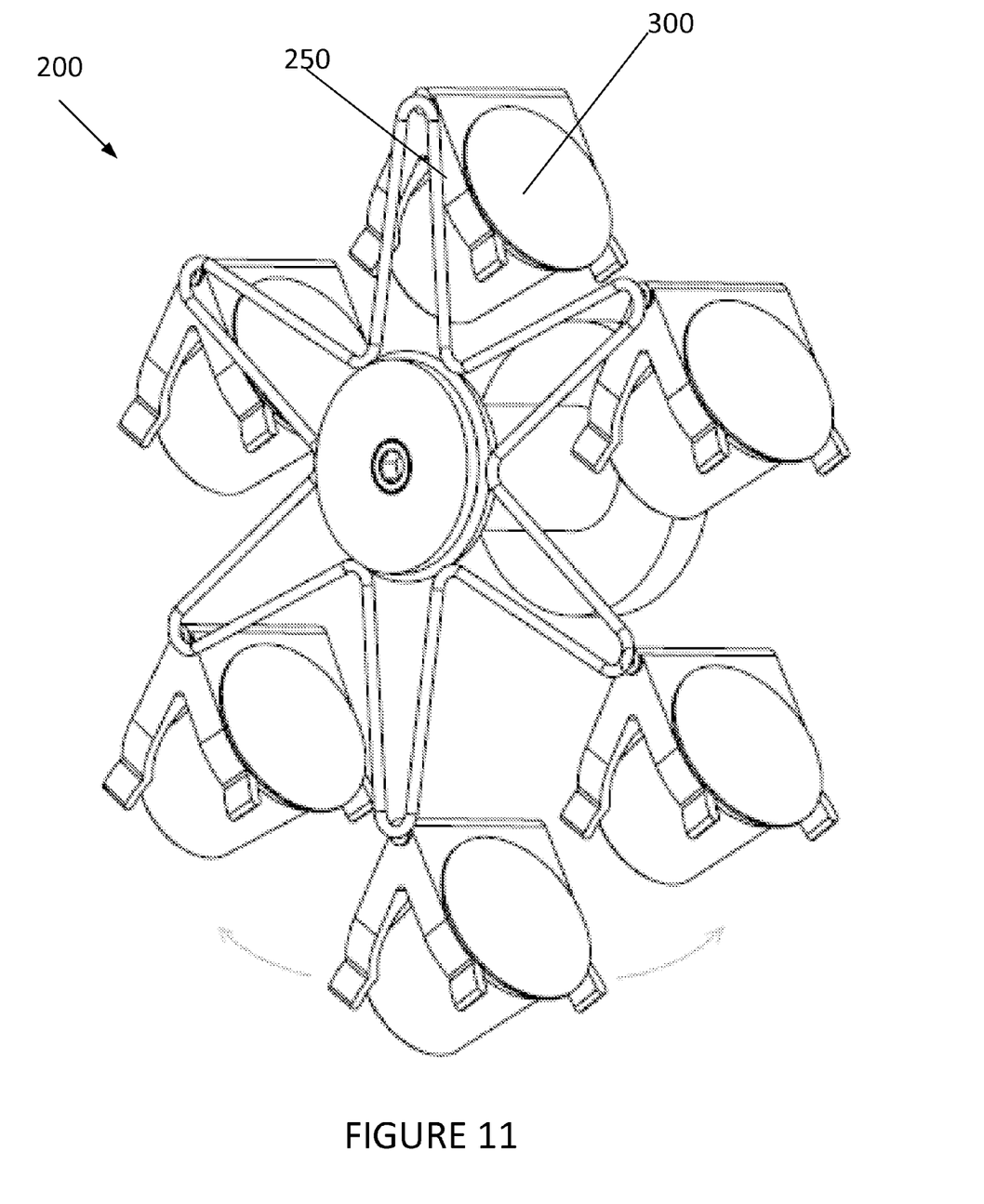
FIG. 11 illustrates a perspective view of the coffee pod storage device and pod of the present invention.

FIG. 11 depicts a perspective view of coffee pod storage device 200 with coffee pods 300 secured within chairs 250. As depicted in FIG. 11 coffee pod storage device 200 may be configured to rotate in a counterclockwise direction and/or a clockwise direction. The direction of rotation of coffee pod storage device 200 may be based on the ease of access of coffee pods 300 within chairs 250.

Furthermore, FIG. 11 depicts coffee pods 300 beings stored within chairs 250 in a first direction. However, in other implementations, coffee pods 300 may be stored within chairs 250 in a second direction. Accordingly, coffee pod storage device 200 may be positioned on different surfaces, wherein based on the orientation of the base and the surface, coffee pods 300 may be coupled to chairs 250 in different directions. Therefore, no matter the available space on a surface, users may easily access the coffee pods 300 stored within chairs.

Figure 12:
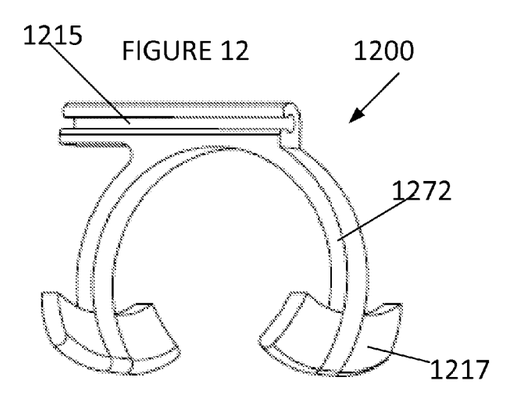
FIG. 12 illustrates a perspective view of an alternate embodiment of the chair of the present invention.

FIG. 12 illustrates a perspective view of an alternate embodiment for a pod chair 1200. The pod chair may include a sleeve 1215 with a channel. The channel may extend through sleeve 1215. In embodiments, the sleeve 1215 may be coupled with a curved holding arm 1272. The curved holding arm 1272 may include a gripping tab 1217, wherein gripping tab may be configured to grip and hold the beverage pod.

Figure 13:
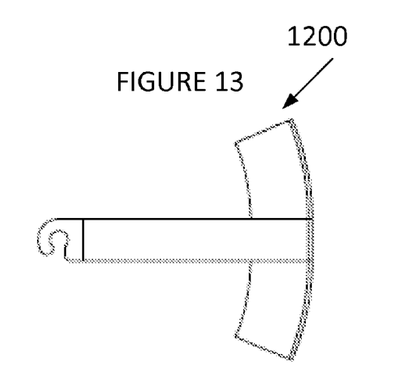
FIG. 13 illustrates a side view the chair of the present invention.

FIG. 13 illustrates a side view of the alternate embodiment for the pod chair depicted in FIG. 12.

Figure 14:
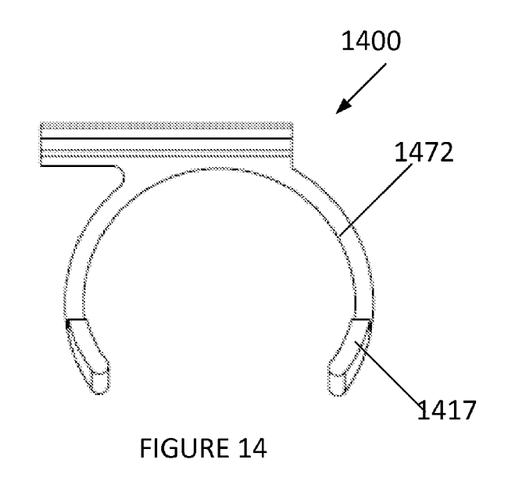
FIG. 14 illustrates a top view of the chair of the present invention.

FIG. 14 illustrates a top view of an alternate embodiment for a pod chair 1400. In the embodiment depicted in FIGS. 14 and 15, the gripping tabs 1417 may only extend away from the curved holding arms 1472 in a single direction.

Figure 15:
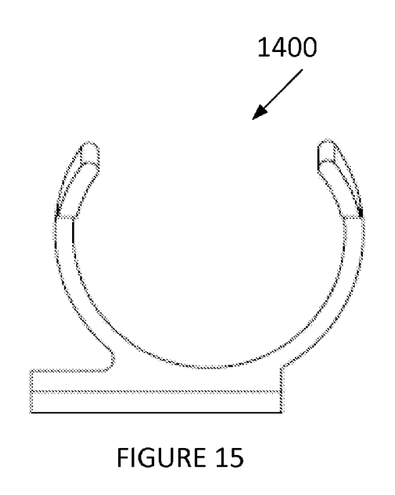
FIG. 15 illustrates a bottom view of the chair of the present invention.

FIG. 15 illustrates a bottom view of an alternate embodiment for the pod chair depicted in FIG. 14.

Figure 16:
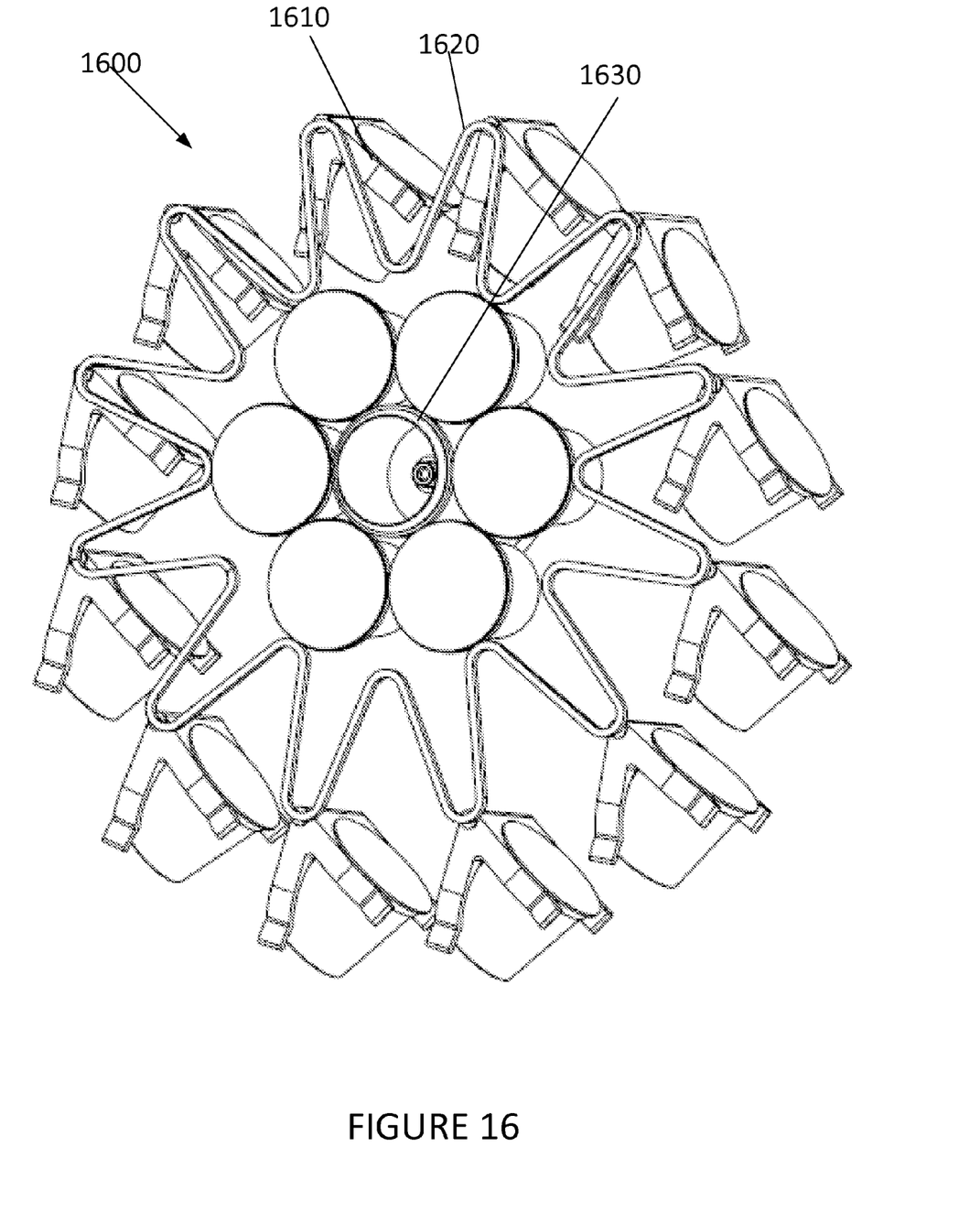
FIG. 16 illustrates a perspective view of a coffee pod storage device.

FIG. 16 depicts one embodiment of coffee pod storage device 1600. Coffee pod storage device 1600 may include sixteen coffee pod chairs 1610 that are coupled with frame 1630. The chairs 1610 may be positioned at an outmost circumference of the frame, wherein each chair 1610 may be configured to store a single coffee pod. In embodiments, each chair 1610 may be configured to hold a coffee pod in either a first direction or a second direction, and each chair 1610 may be configured to freely rotate on an axis. The chairs 1610 may be rotated based on the distribution of weight of a coffee pod held by a respective chair. Accordingly, each of the chairs 1610 may be independently rotated.

Coffee pod storage device 1600 may also include an internal storage system 1630. Internal storage system 1630 may include a plurality of slots, wherein each of the slots is configured to hold a single coffee pod. The slots may be oriented to hold coffee pods in a direction that is perpendicular to coffee pods secured within chairs 1610.

Figure 17:
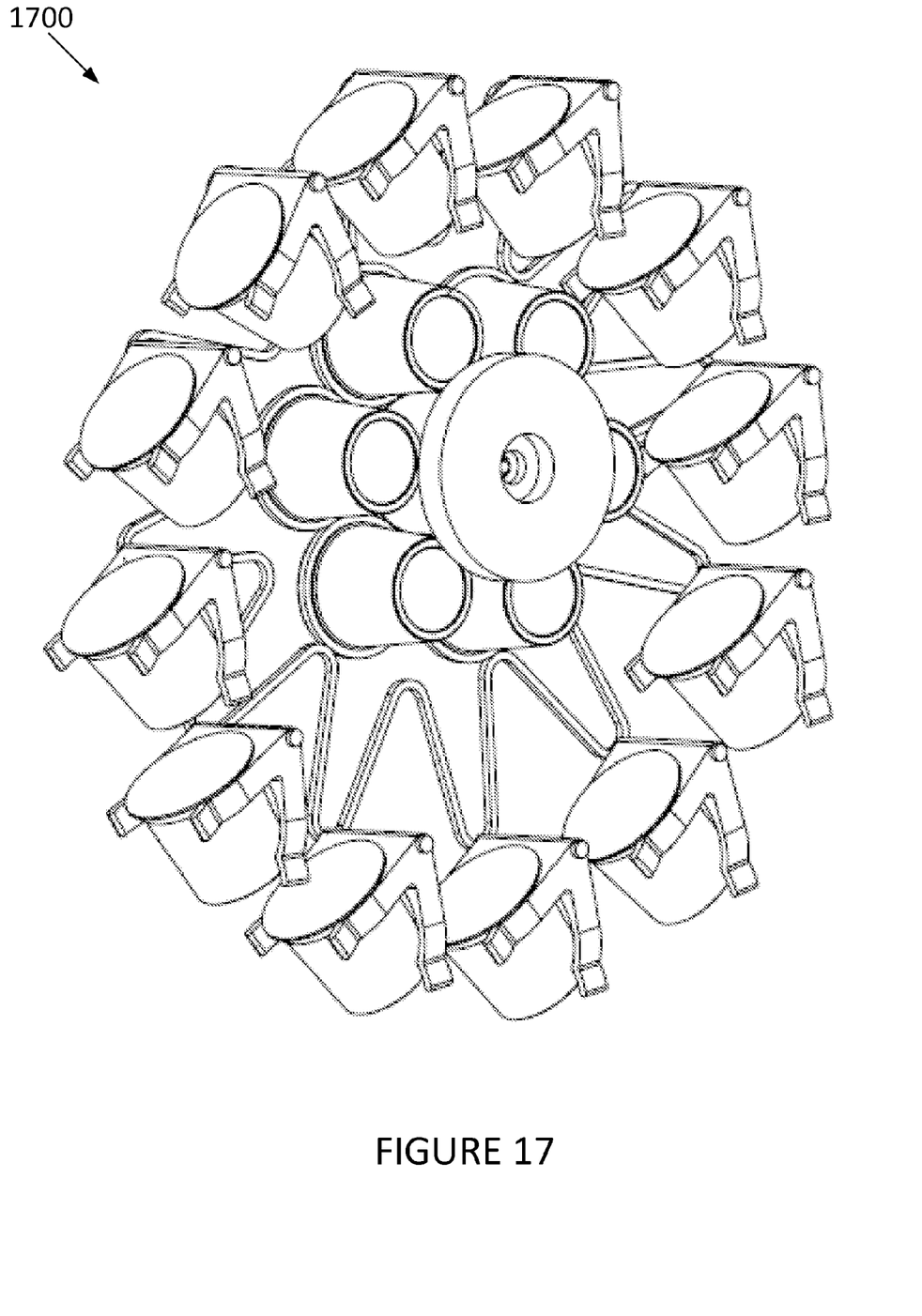
FIG. 17 illustrates a perspective view of a coffee pod storage device.

FIG. 17 illustrates a rear view of coffee pod storage device 1600.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

What is claimed is:

1. A coffee pod storage device comprising:
   a base with a planar surface and a first circumference, the planar surface being configured to be positioned on a counter top or a sidewall of an appliance;
   a shaft with a first end and a second end, a first end of the base being configured to be coupled with the shaft, and the shaft being configured to extend away from the base, the shaft having a second circumference and a length that is at least at long as a coffee pod;
   a rotatable disk coupled with the second end of the shaft, the rotatable disk having a third circumference and being configured to rotate clockwise or counterclockwise while the shaft is configured to be stationary, the third circumference being larger than the second circumference and smaller than the first circumference;
   a support frame with an inner circumference and a plurality of extension arms, the inner circumference being configured to be positioned around a circumference of the disk, and the plurality of extension arms extending away from the inner circumference in a direction that is perpendicular to an axis of rotation of the disk;
   a plurality of chairs coupled to inner sidewalls of the plurality of extension arms, wherein each of the plurality of chairs includes at least two pairs of holding arms, the at least two pairs of holdings arms being configured to grip and store a coffee pod in a first direction or a second direction, wherein each of the plurality of chairs may independently rotate on a respective axis that is perpendicular to the axis of rotation of the disk, the plurality of chairs being positioned between the base and the support frame.

2. The system of claim 1, wherein each of the plurality of extension arms on the support frame includes an axial arm, the axial arm extending away from a respective extension arm in a direction that is parallel to the axis of rotation of the disk.

3. The system of claim 2, wherein the axial arm is configured to be inserted into a channel that extends through a respective chair.

4. The system of claim 1, wherein each of the plurality of chairs includes a first set of coffee pod holders and a second set of the coffee pod holders, the first set of coffee pod holders being configured to hold a coffee pod in the first direction and the second set of coffee pod holders being configured to hold the coffee pod in the second direction, wherein only the first set of coffee pod holders or the second set of coffee pod holders may hold a coffee pod at a given instance, wherein a void is positioned between the first set of coffee pod holders and the second set of coffee pod holders.

5. The system of claim 4, wherein the first set of coffee pod holders and the second set of coffee pod holders each include a right arm and a left arm, the right arm and the left arm extending at a downward angle from a channel that extends through the chair.

6. The system of claim 5, wherein a plurality of coffee pods are positioned in either the first arms of the plurality of chairs or the second arms of the plurality of chairs based on a direction of rotation of the disk and a placement of the base.

7. The system of claim 1, wherein the coffee pod storage device includes sixteen chairs.

8. The system of claim 1, wherein the support frame includes a plurality of slots positioned within the inner circumference, each of the slots being shaped to hold a coffee pod.

9. The system of claim 1, wherein the base is coupled to the counter top or the sidewall of the appliance via magnets.

10. The system of claim 1, wherein the plurality of chairs are positioned between the disk and the base, and the support frame is configured to rotate when the disk is rotated.

* * * * *